United States Patent [19]

Sellstedt

[11] 3,897,416

[45] July 29, 1975

[54] SYNTHESIS OF 2-AMINO-5-ARYL-3H-1,4-BENZODIAZEPINES

[75] Inventor: John H. Sellstedt, King of Prussia, Pa.

[73] Assignee: American Home Products Corporation, New York, N.Y.

[22] Filed: Nov. 28, 1972

[21] Appl. No.: 310,052

[52] U.S. Cl.... 260/239 BD; 260/239 A; 260/239 E; 260/247.5 H; 260/268 BC; 260/293.59; 260/326.81; 424/244; 424/250; 424/248; 424/267; 424/274

[51] Int. Cl............................................. C07d 53/06
[58] Field of Search .... 260/239 BD, 293.59, 239 A, 260/239 E, 247.5, 268 BC, 326.81

Primary Examiner—Henry R. Jiles
Assistant Examiner—Robert T. Bond
Attorney, Agent, or Firm—Robert Wiser

[57] ABSTRACT

2-Phosphonic acid esters and 2-halo substituted 5-aryl-3H-1,4-benzodiazepines are utilized to prepare 2-amino-5-aryl-3H-1,4-benzodiazepines.

4 Claims, No Drawings

3,897,416

SYNTHESIS OF 2-AMINO-5-ARYL-3H-1,4-BENZODIAZEPINES

BACKGROUND OF THE INVENTION

This invention relates to compositions of matter classified in the art of medicinal organic chemistry as 2-amino-5-aryl-3H-1,4-benzodiazepines, and to a new process for preparing them. Compounds of this class are known for their pharmaceutical efficacy, as depressants to the central nervous system.

Members of this chemical class may be prepared from a corresponding quinazoline; see for example, L. H. Sternbach, and E. Reeder, J. Org. Chem., 26, 1111 (1961); or from a corresponding thiolactam as in, for example, G. A. Archer, and L. H. Sternbach, J. Org. Chem., 29, 231 (1964).

The present invention provides a new and practical means for converting suitably substituted or unsubstituted 2-phosphonic acid ester- and 2-halo-5-aryl-3H-1,4-benzodiazepines into 2-amino-5-aryl-3-H-1,4-benzodiazepines.

SUMMARY OF THE INVENTION

The invention sought to be patented resides in the concept of a process for preparing a compound of the formula:

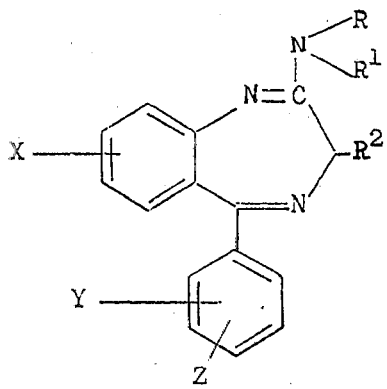

wherein X, Y, and Z may be the same or different and are chosen from the group consisting of hydrogen, halogen, nitro, cyano, trifluoromethyl, alkyl of from 1 to 6 carbon atoms, alkoxy containing from 1 to 6 carbon atoms, phenyl, alkoxyphenyl containing from 7 to 12 carbon atoms, heteroaryl, phenalkyl or from 7 to 12 carbon atoms, dialkylamino containing from 2 to 12 carbon atoms, acyloxy of from 1 to 6 carbon atoms, thioalkyl containing from 1 to 6 carbon atoms, and alkylsulfonyl containing from 1 to 6 carbon atoms; R and $R^1$ may be the same or different and are chosen from the group consisting of hydrogen, alkyl of from 1 to 6 carbon atoms, alkoxy containing from 1 to 6 carbon atoms, aryl, aralkyl of from 7 to 12 carbon atoms, heteroaryl, dialkylaminoalkyl, and when taken together are $-(CH_2)_n-$ wherein $n$ is from 3 to 7, $-(CH_2)_2 O (CH_2)_2-$,

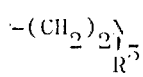

$(CH_2)_2-$ wherein $R^3$ is alkyl of from 1 to 6 carbon atoms, aryl, and dialkylaminoalkyl; $R^2$ is hydrogen, alkyl of from 1 to 6 carbon atoms, alkoxy containing from 1 to 6 carbon atoms, and acyloxy of from 1 to 6 carbon atoms; comprising reacting a compound of the formula:

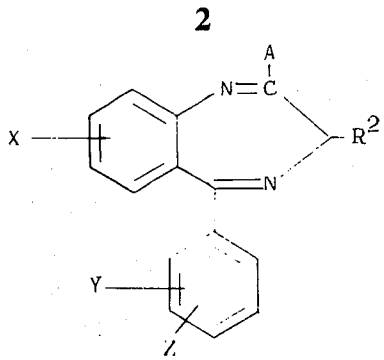

wherein A is halogen, or a phosphonic acid ester containing from 2 to 24 carbon atoms, and X,Y,Z, and $R^2$ are as defined above; with an amine of the formula

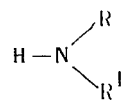

wherein R and $R^1$ are as defined above.

DESCRIPTION OF THE INVENTION

In describing the invention reference will be made to FIG. 1, which illustrates schematically the novel process of the invention. For reasons of convenience, the process is described utilizing specific embodiments of the invention, which embodiments are identified by use of Roman numerals. The use of specific embodiments to illustrate the invention is merely descriptive and is not intended to delimit the scope of the invention.

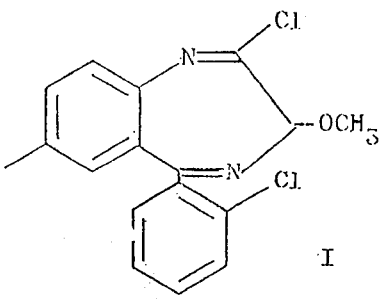

I

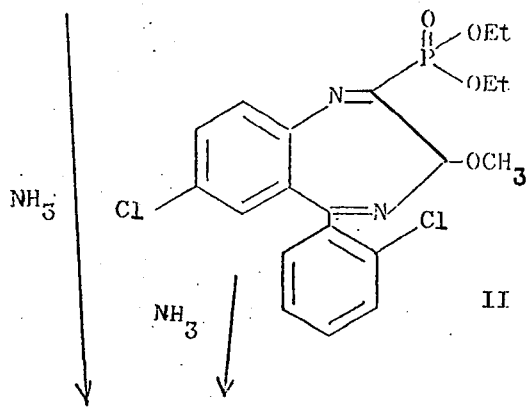

II

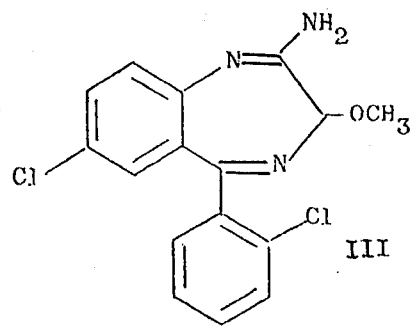

III

Figure 1

The starting materials utilized in the process of the present invention may be readily prepared. Thus for example the preparation of the benzodiazepine 2-halides of the type illustrated by formula I is described in my copending U.S. Pat. Application Ser. No. 293,701, filed Sept. 29, 1972, and the preparation of the benzodiazepine phosphonic acid esters of the type illustrated by formula II is described in my copending U.S. Patent Application Ser. No. 293,626, filed Sept. 29, 1972, and entitled "5-Aryl-3H-1,4-Benzodiazepine-2-Phosphonic Acids and Derivatives."

Referring now to FIG. 1, the benzodiazepine starting material of the instant process may be either a 2-halo-5-aryl-3H-1,4-benzodiazepine wherein the 2-halo substituent may be either bromine or chlorine (e.g., I), or a 5-aryl-3H-1,4-benzodiazepine-2-phosphonic acid ester (e.g., II). The term phosphonic acid ester, is meant to indicate a moiety of structure

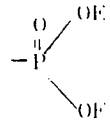

wherein E and F may be the same or different and are straight and branched chain alkyl radicals of from 1 to 6 carbon atoms e.g., ethyl, i-propyl, and hexyl, and phenalkyl radicals of from 7 to 12 carbon atoms e.g., benzyl. The alkyl groups of the 2-phosphonic acid ester substituent may be varied without substantially influencing the course of the instant process.

A benzodiazepine starting material for example I or II is reacted with ammonia, or a primary or secondary amine to produce the 2-amino-5-aryl-3H-1,4-benzodiazepine, for example III. If the amine reactant is ammonia, the product will be a 2-unsubstituted amino-benzodiazepine, and if a primary or secondary amine reactant is used, the product will be a 2-mono or 2-di-substituted amino-benzodiazepine. The amine reactant also may be a cyclic amine for example morpholine, piperidine, and pyrrolidine; and a reacting amine may be used which itself contains a nonreactive tertiary amine function: for example the amine may be dimethylaminopropylamine and the like.

The process of the instant invention is conveniently carried out in suspension or solution; thus for example the starting benzodiazepine of type I or II may be dissolved in an excess of the reacting amine at about 0° C., allowed to stir for about 3 hours, and may optionally be allowed to reach room temperature and stir for about 3 additional hours. The 2-amino-benzodiazepine product is then collected and purified by standard procedures, for example evaporation of the solvent at reduced pressure, followed by recrystallization of the residue.

The times and temperatures utilized for this reaction are not critical and variations will suggest themselves to those skilled in the art, a convenient temparature for the initial contacting of the reactive amine and the starting benzodiazepine, has been found to be about 0° C. It will be obvious, that an acid molecule (e.g., hydrogen chloride, dialkylphosphonic acid) is also produced during the course of the instant process reaction, which acid should be neutralized in order for the reaction to proceed efficiently.

An excess of the reacting amine may be utilized to neutralize the acid produced.

The reaction may also be carried out in an inert solvent (e.g., benzene, dichloromethane, diethylether) containing an excess of the reacting amine, or containing the reacting amine and a non-reactive amine (e.g., triethylamine, pyridine, N,N-diethylaniline) which non-reactive amine functions to absorbe the acid produced by the reaction. A preferred procedure utilizes an equivalent amount of the reacting amine and at least an equivalent amount of a non-reactive amine. The non-reactive amine may also serve as the solvent for the reaction thus, for example, the starting material (2-halo-benzodiazepine, or benzodiazepine-2-phosphonic acid ester) and an equivalent amount of a reactive amine e.g., piperidine, can be dissolved in pyridine as the solvent at approximately 0° C. to 5° C. and allowed to stir for about 3 hours. This mixture can then be allowed to warm to room temperature and optionally can be stirred at room temperature for from 1 to about 4 more hours. The product can then be isolated and purified, for example, by evaporating the solvent and recrystallizing or chromatographing the resulting material.

Again referring to FIG. 1, in a preferred embodiment of the invention, wherein the amine is ammonia, the reaction is carried out by placing the benzodiazepine starting material in a concentrated solution of ammonia in water (known in the art as concentrated ammonium hydroxide solution) and warming to approximately 50° C. in a pressure vessel for approximately 6 hours.

The resulting mixture is filtered, and the collected solid recrystallized to produce a pure 2-amino-5-aryl-3H-1,4-benzodiazepine.

The following examples illustrate the best mode contemplated by the inventor for carrying out the process of the invention.

EXAMPLE I

2-Amino-7-Chloro-5-(o-Chlorophenyl)-3-Methoxy-3H-1,4-Benzodiazepine 2,7-Dichloro-5-(o-chlorophenyl)-3-methoxy-3H-1,4-benzodiazepine (7.06 g., 0.02 mole)I is stirred with 100 ml. concentrated ammonium hydroxide in a pressure vessel at 50° for 6 hours. The mixture is filtered, and the solid is washed with water, giving 6.59 g. of white crystals, m.p. 194°–198°. The sample is crystallized from acetonitrile giving 4.46 g., m.p. 216°–219°, of 2-amino-7-chloro-5-(o-chlorophenyl)-3-methoxy-3H-1,4-benzodiazepine.

EXAMPLE II

2-Amino-7-Chloro-5-(o-Chlorophenyl)-3-Methoxy-3H-1,4-Benzodiazepine

Diethyl 7-chloro-5-(o-chlorophenyl)-3-methoxy-3H-1,4-benzodiazepine-2-phosphonic acid (500 mg.)II is stirred with 15 ml. concentrated ammonium hydroxide in a pressure vessel at 50° for 7 hours. The mixture is filtered, giving 300 mg. of 2-amino-7-chloro-5-(o-chlorophenyl)-3-methoxy-3H-1,4-benzodiazepine as white solid, m.p. 192°–202°. Crystallization from acetonitrile gives white crystals, m.p. 218°–220°.

| Analysis for: | $C_{16}H_{13}Cl_2N_3O$ |
|---|---|
| Calculated: | C, 57.48; H, 3.92; N, 12.57; Cl, 21.20 |
| Found: | C, 57.74; H, 3.94; N, 12.64; Cl, 20.18 |

EXAMPLE III

2-(1-Piperadino)-7-Chloro-5-(o-Chlorophenyl)-3-Methoxy-3H-1,4-Benzodiazepine 2,7-Dichloro-5-(o-chlorophenyl)-3-methoxy-3H-1,4-benzodiazepine (10.6 g., 0.03 mol)I is added to a solution of piperidine (2.6 g., 0.03 mol) in pyridine (45 ml.) at 5° C. and allowed to stir for 3 hours. The mixture is allowed to come to room temperature and stir an additional 3 hours. The solvent is evaporated and the residue chromatographed, and recrystallized yielding the title compound.

What is claimed is:

1. A process for preparing a compound of the formula:

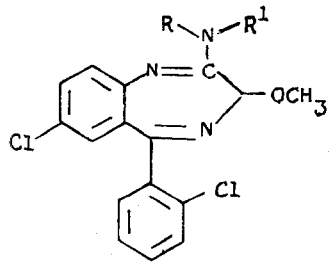

wherin R and $R^1$ may be the same or different and are chosen from the group consisting of hydrogen, alkyl of from 1 to 6 carbon atoms, and when taken together are $-(CH_2)_n-$ wherein n is from 3 to 7, $-(CH_2)_2-O-(CH_2)_2-$, and

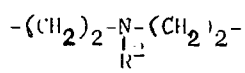

wherein $R^2$ is alkyl of from 1 to 6 carbon atoms; comprising reacting a compound of the formula:

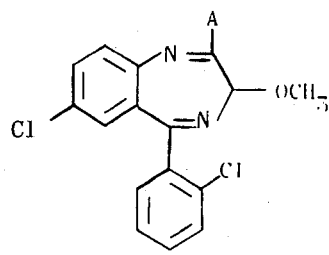

wherein A is chlorine, $PO(OMe)_2$, or $PO(OEt)_2$ with an amine of the formula:

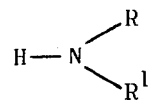

wherein R and $R^1$ are as defined above.

2. The process according to claim 1 wherein R and $R^1$ are hydrogen and A is chlorine.

3. The process according to claim 1 wherein R and $R^1$ are hydrogen and A is $PO(OMe)_2$.

4. The process according to claim 1 wherein R and $R^1$ are hydrogen and A is $PO(OEt)_2$.

* * * * *